United States Patent
Vatanen

(10) Patent No.: US 6,711,262 B1
(45) Date of Patent: Mar. 23, 2004

(54) PROCEDURE FOR THE CONTROL OF APPLICATIONS STORED IN A SUBSCRIBER IDENTITY MODULE

(75) Inventor: Harri Vatanen, Windsor (GB)

(73) Assignee: Sonera Oyj, Helsinki (FI)

(*) Notice: Subject to any disclaimer, the term of this patent is extended or adjusted under 35 U.S.C. 154(b) by 0 days.

(21) Appl. No.: 09/475,554

(22) Filed: Dec. 30, 1999

(30) Foreign Application Priority Data

Jul. 2, 1997 (FI) .................................................. 972840
Jun. 16, 1998 (FI) ................................... PCT/FI98/00522

(51) Int. Cl.[7] .............................. H04K 1/00; H04L 9/00
(52) U.S. Cl. ....................... 380/277; 380/41; 380/257; 380/278; 380/279; 380/259
(58) Field of Search ................................ 380/255, 257, 380/258, 259, 260, 277, 41

(56) References Cited

U.S. PATENT DOCUMENTS

| | | | | |
|---|---|---|---|---|
| 5,301,234 A | * | 4/1994 | Mazziotto et al. | 380/247 |
| 5,870,459 A | * | 2/1999 | Phillips et al. | 455/409 |
| 5,966,654 A | * | 10/1999 | Croughwell et al. | 455/414.1 |
| 5,966,663 A | * | 10/1999 | Gleason | 455/466 |
| 6,023,689 A | * | 2/2000 | Herlin et al. | 705/67 |
| 6,047,070 A | * | 4/2000 | Raaf | 380/270 |
| 6,169,890 B1 | * | 1/2001 | Vatanen | 455/406 |
| 6,237,093 B1 | * | 5/2001 | Vatanen | 713/162 |
| 6,373,946 B1 | * | 4/2002 | Johnston | 380/211 |

FOREIGN PATENT DOCUMENTS

| | | |
|---|---|---|
| EP | 0 644 513 A2 | 3/1995 |
| EP | 0 748 135 A2 | 12/1996 |
| WO | WO 96/25828 | 8/1996 |
| WO | WO 96/32700 | 10/1996 |

* cited by examiner

*Primary Examiner*—Thomas R. Peeso
*Assistant Examiner*—Kambiz Zand
(74) *Attorney, Agent, or Firm*—Cohen, Pontani, Lieberman & Pavane

(57) ABSTRACT

A procedure for the control of applications stored in a user's subscriber identity module (SIM) in a data communication system that includes a data communication network, a terminal device connected to the data communication network and to which the subscriber identity module is connected, and an application control server that is connected to the data communication network. The subscriber identity module contains a stored application that makes use of the data communication network and that is used by way of the terminal device. A key list comprising one or more application-specific keys is stored in the user's subscriber identity module, and a corresponding key list is also stored in the application control server which is operable to control applications stored in the subscriber identity modules of multiple users of the network. The application stored in the user's subscriber identity module is activated and/or closed through the transmission, verification and use of keys stored in the key lists at the subscriber identity module and at the application control server.

9 Claims, 1 Drawing Sheet

PROCEDURE FOR THE CONTROL OF APPLICATIONS STORED IN A SUBSCRIBER IDENTITY MODULE

BACKGROUND OF THE INVENTION

1. Field of the Invention

The present invention is directed to procedures for the control of access keys and the verification and control of rights of access to and use of applications stored in a subscriber identity module in a mobile telecommunications network.

2. Description of the Related Art

With the development of mobile communication networks, especially GSM (Global System for Mobile Communications) networks, has come an accompanying and corresponding increase in and development of the services offered through such networks. Problems have however been encountered, particularly (though not exclusively) in applications making use of mobile communication networks and requiring a high level of data security—e.g. in payments for services, ordering, order confirmation, payment orders, bank services, etc.—in connection with secure application-specific control of keys (e.g. encryption, decryption, access and security keys, and passwords) and billing of license fees for operator-independent services. These problems are accentuated by the fact that subscriber identity modules (SIMs) used in CSM terminals are manufactured by a number of different and unrelated enterprises and that there are many companies offering applications and a variety of operators delivering subscriber identity modules to customers. In addition, the applications used to provide services in a GSM network are often produced by outside software suppliers or the like, as a result of which the licenses for the applications belong to those outside software suppliers.

If a license fee is to be charged for the use of an application, it is necessary to carefully follow or monitor usage of the application and define the limits within which the application may be used. No solution has heretofore been presented to meet these requirements, particularly one that allows centralized control over subscriber identity modules and of the passwords relating to applications stored in the SIMs.

OBJECTS AND SUMMARY OF THE INVENTION

It is accordingly the desideratum of the present invention to overcome and eliminate the drawbacks and deficiencies of the prior art, as for example described hereinabove.

It is a particular object of the invention to provide a new type of procedure which is applicable to the control of keys to applications that make use of the subscriber identity module (SIM) and to the control of license agreements relating to such applications and their use, such that the procedure can be easily implemented in a centralized form independent of the fact of different suppliers of the applications.

A further object of the invention is to provide a procedure having a high level of data security that allows flexible and reliable safeguarding of the interests of the operator, module manufacturer, application developers and users of applications.

These and other objects and features of the invention are realized in accordance, by way of preferred embodiment, with the following description and disclosure of a procedure for the control of applications stored in a subscriber identity module. The inventive procedure may by way of example, and typically will, be implemented and practiced in a data communication system that includes a data communication network and a terminal device connected to the data communication network. A preferred data communication network is a GSM network and a preferred terminal device is a GSM mobile or wireless telephone. The GSM telephone includes or is provided with a connected or connectable subscriber identity module (SIM) in which an application is stored; the SIM, inter alia, utilizes the data communication network and is used via the terminal device for banking and/or other available services. The data communication system also includes an application control server that is connected to the data communication network. The application control server is preferably a computer or equivalent which is provided with means for setting up a connection to the data communication network and with software for implementing the required applications. That software is preferably managed by service providers or by data communication suppliers that provide management services.

In accordance with the invention, a key list comprising one or more application specific keys is stored in the subscriber identity module. The key list is preferably linked or connected with the subscriber identity module by using a unique identifier associated with that subscriber identity module. A corresponding list is also stored in the application control server and the application stored in the subscriber identity module is activated and/or closed using the key list.

Thus, in the inventive procedure, a list of the keys K(1), K(2), K(n) and KA(1) and KA(2) needed for activating or closing different applications on a SIM of or associated with (but in any event connected to) a mobile station are stored on that SIM. The SIM—which may be a fixed or replaceable component of the mobile station or a smart card or the like associated or usable with the mobile station—preferably also contains or stores one or more modules operable for activating and closing (i.e. deactivating) the application. In conjunction with its manufacture, the SIM has been initialized with a security module as is currently known in the art. The activating/closing module is used to ensure that the application—such as an electronic signature utilizing the SIM or smart card—can if necessary be activated and/or closed by the key control system. Thus, the procedure of the invention implements application-specific key control in addition to that functionality provided by heretofore known SIM smart card key control systems.

The inventive application-specific key control system is cognizant of the keys needed for each application or applications, and these keys need not be known to the mobile communication operator's key control system. The application-specific key control system of the invention can therefore be separated from the operator's key control systems, which advantageously makes it possible to provide a service that is independent of the data communication network and operator. The key control system responsible for the application need not know the teleoperator's keys which are used in a well-known manner for user identification in basic mobile communication services. Key control for applications is instead implemented in a protected database, from which application-specific services utilizing the SIM card and requiring a high level of data security can be activated and closed.

As compared with prior art, the inventive procedure advantageously allows local identification of the user of services that require a high level of data security by all service providers in the networks of different operators, as well as centralized implementation of key control. The inventive procedure additionally permits and accommodates ready control and billing of user-specific payments and licenses for the use of different applications.

In an embodiment of the invention, the validity of the user's right of access to the application stored in the subscriber identity module is verified periodically. If the attempted verification establishes that the access right has expired, then using an appropriate key the application in the subscriber identity module can be closed or terminated.

In conjunction with the activation of the application stored in the subscriber identity module, the subscriber identity module is sent a message concerning the opening of the application, said message containing the application key k(n) to be used in the application. At the application control server, the application key is linked or attached to the unique identifier corresponding to the subscriber identity module. Based on the stored key list, the right of access to the application is preferably verified at or in the application control server and, if a valid access right is found to exist, then the special data needed in the application—e.g. the service description and appropriate application-specific user interface codes—are transmitted to the SIM.

In some embodiments of the present invention, all messages between the application control server and the terminal device are encrypted without regard to the content of the message.

Other objects and features of the present invention will become apparent from the following detailed description considered in conjunction with the accompanying drawings. It is to he understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
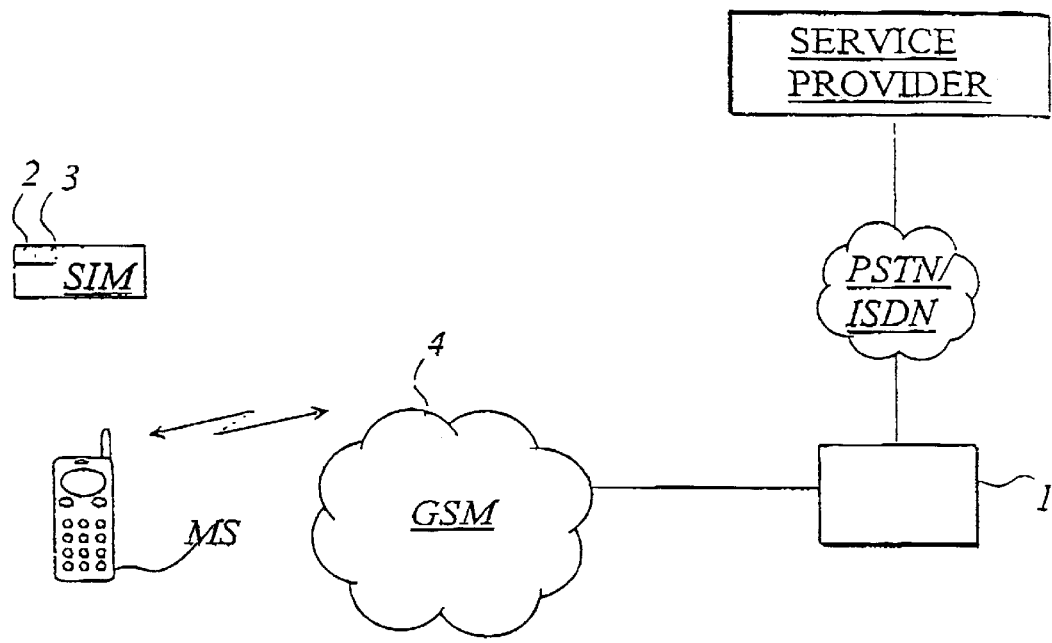
FIG. 1 diagrammatically depicts a preferred data communication system in which the procedure of the present invention may be implemented and practiced.

Shown in FIG. 1, by way of illustrative example, is a data communication system in which the procedure of the present invention can be implemented and practiced. The FIG. 1 data communication system comprises a GSM telephone network 4, to which is connected a mobile station MS (such as a wireless telephone or data terminal) compatible with the network and provided with (or to which is connected) a subscriber identity module SIM. During its manufacture, the subscriber identity module SIM has been initialized in a known manner using a security module, as for example disclosed in patent specification WO 90/11849. The subscriber identity module further comprises or incorporates one or more activating and closing modules 2, 3 which are used for the activation and closing (i.e. deactivation) of applications.

An application control server 1 of the service provider is connected to the GSM network and to the service provider's equipment, as for example by way of a telephone network PSTN/ISDN. The connection between the application control server 1 and the GSM mobile station MS is set up in accordance with normal GSM practice as either a voice, data or short message (SMS) connection. It should also be understood that the telephone network 4 may alternatively be any other type of data communication network—such for example as a CDMA network, PCN network, or UMTS network or equivalent—and likewise that the mobile station MS may alternatively be any other terminal device compatible with the particular data communication network and to which a subscriber identity module or an equivalent device can be connected. The particular systems and devices herein shown and described are accordingly provided solely for ease of description and illustration.

Figure 2:
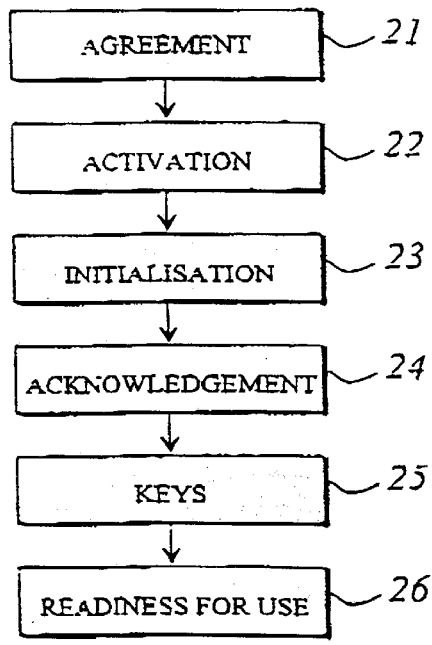
FIG. 2 is a block diagram flow chart of a preferred embodiment of the procedure of the invention.

FIG. 2 presents a block diagram illustrating the various stages of control of an application in a subscriber identity module as carried out by the application control server in accordance with the invention. The example used here, by way of illustration, is a banking application in which a bank gives its customer the right to use its bank services using a GSM telephone MS through and in conjunction with an application that is stored in a subscriber identity module SIM connected to the customer's telephone MS.

The customer is in possession of an identifier (UID) corresponding to and uniquely identifying the SIM module or card. The key k(n) for use with the application (n) that is stored on the SIM card having the identifier UID, as well as the additional keys KA1 and KA2, have been stored in an application-specific key control system in the application control server 1. The customer makes an agreement with the bank to permit customer use of a mobile station-based bank service, whereupon the bank sends the UID corresponding to the customer's SIM card to an application-specific card control system. The application-specific card control system then sends to the SIM card an opening message corresponding to the UID of the SIM card. The opening message includes the customer's user key k(n) which is needed for the bank service and which is to be subsequently used to activate the application stored on the card; the message may also include a welcome or registration message. Using the key k(n) sent by the card control system, the customer can then set the mobile station to bank mode and transmit an acknowledgement of the registration message to the card control system. The key k(n) may also be sent in an encrypted form which is decrypted by a decryption program on the SIM card. Through these steps, the customer now has a licensed key that gives the customer the right to use the particular licensed bank service. The key k(n) is useless to outsiders because it is SIM card-specific and will only activate an application stored on that particular SIM card.

With (and optionally concurrent with) the activation of the card, the customer may be billed for the applicable license fee(s) if the customer acknowledges the registration. The application-specific card control system sends to the bank the necessary identifiers, including the identifier KA(1) needed to activate the bank service. At the bank, the customer and the application-specific identifier sent by the card control system are associated with the respective bank service. Then, using the application-specific activation code KA(1), the bank can load onto the customer's SIM card the service menus and forms and the identifiers needed in utilizing the bank service, whereupon the service becomes available to the customer. The bank-specific service menus and service forms are preferably transmitted to the mobile station by the "dynamic menu load" method or to the SIM card by the OTA (Over The Air) method, as is well known.

If the code KA(1) is correct, the activating/closing module(s) on the card will accept the incoming data and load the menus and forms, and the SIM card will thereby be activated for the bank service.

Specific reference is now made to the inventive procedure flow chart of FIG. 2. At a bank, the customer makes an agreement concerning customer use of a mobile station MS to link to a service of the bank (block 21). The customer, in the agreement, accepts the license conditions required for use of the application by which the service is implemented and executed through the mobile station MS. At the same time, the unique identifier (UID) of the customer's subscriber identity module, or SIM card, is linked to the service in the manner described above. The bank, via the application control server 1, sends the unique identifier (UID) of the customer's subscriber identity module to the application-specific subscriber identity module control system to thereby activate the application stored in the customer's SIM (block 22). The subscriber identity module control system initializes the subscriber identity module by sending or transmitting a registration confirmation to the customer's mobile station (block 23). At the same time, the customer receives a key k(n) that the customer can use to switch the customer's mobile station MS and associated subscriber identity module SIM into bank mode and to subsequently open the service as desired.

Thus, at block 24 the customer inputs or enters the key k(n) into the mobile station MS and accepts the registration by acknowledging the registration message sent by the subscriber identity module control system. The subscriber identity module control system then transfers to the bank the keys needed for use of the application so that the application-specific menus and customer identifiers can be loaded into the customer's mobile station MS and subscriber identity module SIM (block 25). The customer's mobile station has now been opened and activated and is ready for use of the bank service (block 26). If the customer misuses the system or otherwise fails to observe the terms of the agreement, the subscriber identity module control system can close the application in the subscriber identity module and thereby make it unavailable to the customer. The application is closed through the use of a closing message containing a closing key.

Thus, should the customer fail to make the payments subsequently charged for use of the application, as for example an annual license fee to be paid for the service, further use of the application can be prevented by transmitting a closing message from the key control system to the customer's subscriber identity module SIM. The encrypted closing message contains the closing key by which the application in the subscriber identity module will recognize that the sender of the message has the right to close or deactivate, and thereby render inaccessible to the customer, the application stored on the SIM card. Similarly, if the mobile station together with the subscriber identity module SIM is lost or stolen, the card or application can be easily closed. The application can thereafter be opened and reactivated in a corresponding manner from the application-specific key control system.

Thus, while there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. In a data communication system that includes a data communication network, a terminal device connected to the data communication network, a subscriber identity module connected to the terminal device and containing a stored application for use by the terminal device and which makes use of the data communication network, and an application control server connected to the data communication network, a procedure for controlling the application stored in the subscriber identity module, comprising the steps of:

storing in the subscriber identity module a key list comprising a plurality of keys associated with the stored application, said keys comprising a closing key for use in closing the application and an activation key for use in activating the application;

storing in the application control server a server key list corresponding to the key list stored in the subscriber identity module;

generating at the application control server one of an activating message including the activation key stored in the server key list and a closing message including the closing key stored in the server key list;

transmitting the generated one of the activating message and the closing message from the application control server to the subscriber identity module; and checking, at the subscriber identity module after receipt from the application control server of the transmitted one of the activating message and the closing message, the key included in the received one of the activating message and the closing message against the key list stored in the subscriber identity module and, if the received key is found to match one of the stored keys, activating the application if the received key matches the activation key in the stored key list in the subscriber identity module and closing the application if the received key matches the closing key in the stored key list in the subscriber identity module.

2. A procedure in accordance with claim 1, wherein the subscriber identity module includes a module operable for selectively activating and closing the stored application.

3. A procedure in accordance with claim 1, further comprising the step of periodically determining whether there exists a valid right of access to the stored application in the subscriber identity module.

4. A procedure in accordance with claim 1, wherein the subscriber identity module has a unique identifier associated with the subscriber identity module, and further comprising the step of linking, at the application control server, the server key list to the unique identifier.

5. A procedure in accordance with claim 1, wherein the subscriber identity module has a unique identifier associated with the subscriber identity module, and further comprising the steps of:

transmitting, from the application control server to the subscriber identity module, a message concerning opening of the application and including an application key k(n) for use in the application; and linking, at the application control server, the application key k(n) to the unique identifier of the subscriber identity module.

6. A procedure in accordance with claim 1, further comprising the steps of:

verifying, at the application control server, whether there exists a right of access to the application using the subscriber identity module; and transmitting from the application control server to the subscriber identity module, where it is verified that the right of access exists, special data needed to use the application.

7. A procedure in accordance with claim 1, wherein transmissions between the application control server and the subscriber identity module are encrypted.

8. A procedure in accordance with claim 1, further comprising the step of establishing between the terminal device, to which the subscriber identity module is connected, and the application control server a telecommunication connection via a mobile telephone communication network for carrying transmissions between the application control server and the subscriber identity module.

9. A procedure in accordance with claim 1, wherein the data communication network is a GSM network and the terminal device is a GSM telephone.

* * * * *